United States Patent
Vuda et al.

(10) Patent No.: US 11,916,741 B1
(45) Date of Patent: Feb. 27, 2024

(54) DISCOVERY OF APPLICATION RELATIONSHIPS IN CLUSTERS

(71) Applicant: Oracle International Corporation, Redwood Shores, CA (US)

(72) Inventors: Santhosh Kumar Vuda, Bangalore (IN); Kiran Kumar Palukuri, Bangalore (IN); Kumar G. Varun, Pleasanton, CA (US); Jerry Paul Russell, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/149,908

(22) Filed: Jan. 4, 2023

Related U.S. Application Data

(60) Provisional application No. 63/416,574, filed on Oct. 16, 2022.

(51) Int. Cl.
  *H04L 41/0893* (2022.01)
  *H04L 41/12* (2022.01)
  *H04L 67/60* (2022.01)

(52) U.S. Cl.
  CPC .......... *H04L 41/0893* (2013.01); *H04L 41/12* (2013.01); *H04L 67/60* (2022.05)

(58) Field of Classification Search
  CPC . H04L 41/0893; H04L 41/0894; H04L 67/60; H04L 41/12; H04L 41/122; H04L 41/34; H04L 41/342; H04L 41/344; H04L 41/40
  USPC ....................................................... 709/224
  See application file for complete search history.

(56) References Cited

U.S. PATENT DOCUMENTS

| | | |
|---|---|---|
| 10,778,537 B1 | 9/2020 | Hu et al. |
| 11,451,447 B1 | 9/2022 | Jangam et al. |
| 11,481,243 B1* | 10/2022 | Wang ...................... G06F 9/547 |
| 2018/0109610 A1* | 4/2018 | Einkauf .................. H04L 67/10 |
| 2020/0036796 A1* | 1/2020 | Tollet .................. H04L 12/4633 |

(Continued)

OTHER PUBLICATIONS

Horovits D., "Observability with zero code instrumentation? Meet eBPF", Retrieved from https://logz.io/blog/ebpf-auto-instrumentation-pixie-kubernetes-observability/, Retrieved on Apr. 5, 2023, pp. 13.

(Continued)

*Primary Examiner* — Hee Soo Kim
(74) *Attorney, Agent, or Firm* — Invoke

(57) ABSTRACT

Systems that determine relationships between network components of a cluster using packet filters are disclosed. A system can identify objects that implement services of a cluster and network connections associated with respective pairs of the objects. The system can also filter out network connections from the identified network connections. The filtering can remove connections between source objects and destination objects based on the destination objects lacking any components that implement a service in cluster. The filtering can also retain network connections between source objects and destination objects based on the source objects including components that each implement at least one service, and based on the second destination object including components that each implement at least one service. Additionally, the system can generate relationship maps and network topologies using the determined relationships.

27 Claims, 6 Drawing Sheets

(56) References Cited

U.S. PATENT DOCUMENTS

| | | | |
|---|---|---|---|
| 2021/0243164 A1* | 8/2021 | Murray | H04L 61/4511 |
| 2021/0328877 A1 | 10/2021 | Jung et al. | |
| 2022/0038368 A1* | 2/2022 | Shen | H04L 45/02 |
| 2022/0038501 A1* | 2/2022 | Shen | G06F 9/5077 |
| 2022/0247684 A1* | 8/2022 | Andersson | H04L 45/745 |
| 2023/0115261 A1* | 4/2023 | Xiao | G06F 9/45558 |
| | | | 718/104 |
| 2023/0297436 A1* | 9/2023 | Palukuri | G06F 9/5061 |
| | | | 709/201 |
| 2023/0300187 A1* | 9/2023 | Ellappan | H04L 67/10 |
| | | | 709/226 |

OTHER PUBLICATIONS

Mody V., "A Gentle Introduction to eBPF", Retrieved from https://www.infoq.com/articles/gentle-linux-ebpf-introduction/, May 3, 2021, pp. 12.

\* cited by examiner

DISCOVERY OF APPLICATION RELATIONSHIPS IN CLUSTERS

INCORPORATION BY REFERENCE; DISCLAIMER

The following application is hereby incorporated by reference: application no. 63/416,574 filed on Oct. 16, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to network management, and, more specifically, to determining relationships between network components.

BACKGROUND

Cloud networks can be large, geographically dispersed computing systems comprised of dynamically changing and hardware and software serving multiple clients. Building, deploying, and managing complex cloud networks can be extremely difficult. Accordingly, network providers use orchestration systems, such as KUBERNETES, to deploy and manage cloud networks. Even using an orchestration system, network providers may have difficulty in fully comprehending the relationships between components of the network, such as services, nodes, and pods. Without such comprehension, network providers cannot optimally visualize or manage their networks.

The approaches described in this Background section are ones that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

The embodiments are illustrated by way of example and not by way of limitation in the figures of the accompanying drawings. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in different embodiments. In some examples, well-known structures and devices are described with reference to a block diagram in order to avoid unnecessarily obscuring the present invention.

The embodiments are illustrated by way of example and not by way of limitation in the figures of the accompanying drawings. It should be noted that references to "an" or "one" embodiment in this disclosure are not necessarily to the same embodiment, and they mean at least one.

This Detailed Description section includes the following subsections:
A. GENERAL OVERVIEW
B. SYSTEM ENVIRONMENT
C. SYSTEM ARCHITECTURE
D. DETERMINING SERVICE RELATIONSHIPS
E. COMPUTER NETWORKS AND CLOUD NETWORKS
F. MISCELLANEOUS; EXTENSIONS
G. HARDWARE OVERVIEW

A. General Overview

Systems, methods, and computer-readable media disclosed herein determine relationships between network components of a cluster. One or more embodiments trace network connections using, for example, Berkley Packet Filters (BPF) or extended BPFs (eBPF) to identify relationships among different pods and containers within clusters, as well as dependencies outside the cluster. One or more embodiments perform operations including, identifying objects that implement services and workloads of a cluster and network connections associated with respective pairs of the objects. The operations can also include filtering out network connections from the identified network connections. The filtering can remove connections between source objects and destination objects based on the destination objects lacking any components that implement a service in cluster. The filtering can also retain network connections between source objects and destination objects based on (a) the source objects including components that each implement at least one service or workload and (b) the second destination object including components that each implement at least one service. Additionally, the operations can generate relationship maps and network topologies using the determined relationships.

While this General Overview subsection describes various example embodiments, it should be understood that one or more embodiments described in this Specification or recited in the claims may not be included in this subsection.

B. System Environment

Figure 1:
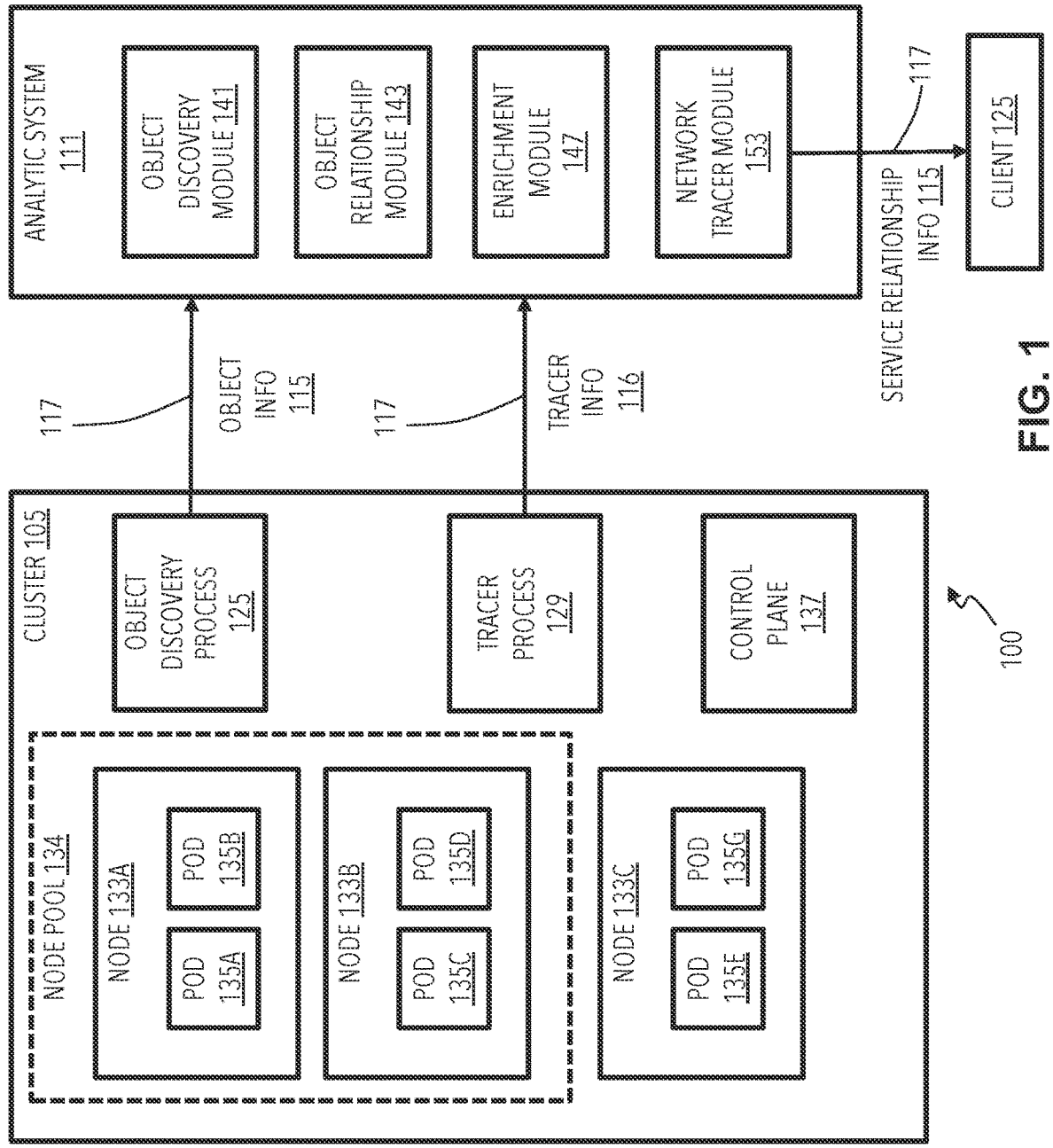
FIG. 1 illustrates a functional flow block diagram of an example system in accordance with one or more embodiments.

FIG. 1 shows a system block diagram illustrating an example of a computing environment 100 for implementing systems and processes in accordance with one or more embodiments. The computing environment 100 includes a cluster 105, analytic system 111, and one or more client devices 125 communicatively connected, directly or indirectly via one or more communication links 117. The communication links 117 can be wired and/or wireless information communication channels, such as the Internet, an intranet, an Ethernet network, a wireline network, a wireless network, a mobile communications network, and/or another communication network.

The cluster 105 can be a logical collection of nodes 133 interconnected by one or more communication networks (not shown), such as a wide area network or a local area network, which work together to support applications and middleware, such as relational databases. The cluster 105 can be one of a number of clusters or virtual clusters, wherein individual clusters and their pods, services, and the like are identified by a respective namespace. Each node 133 can be a computing system (e.g., a server) running an instance of an operating system. The cluster 105 can organize combinations of the nodes 133 (e.g., nodes 133A and 133B) into pools, such as node pool 134, in which all the nodes are assigned to the same task assigned by a control plane 137. One or more of embodiments of the cluster 105 comprises a KUBERNETES cluster. KUBERNETES is a software system that orchestrates a cluster by bundling tasks performed by the nodes 133 into containers. For example, KUBERNETES can scale a number of containers running, and ensure the containers are efficiently distributed across the nodes 133. Pods 135 are set of one or more containers deployed to a single node 133 having shared storage and network resources. Contents of a pod 125 are co-located and co-scheduled, and run in a shared context. A service exposes an application running on a set of pods 135.

One or more embodiments of the cluster 105 can include an object discovery process 125 and a network tracer process 129. The object discovery process 125 can be a monitoring process (e.g., a daemon) executed in the cluster 105 that collects and stores object information 115 from an application program interface (API), such as a KUBERNETES API, executed using the control plane 137 or one of the nodes 133.

The network tracer process 129 can be a monitoring process executed by one of the pods 135 types across all the nodes 133 of the cluster 105. The network tracer process 129 can continuously or periodically run a service, such as a customized TCPConnect BPF program based on the BPF Compiler Collection (BCC), that generates tracer information 116 by collecting outbound traffic from the nodes 133. BCC is a toolkit available in LINUX® for creating efficient kernel tracing and manipulation programs that use extended BPF. For example, the network tracer process 129 can execute a TCPConnect program collecting outbound traffic (e.g., TCP connections) initiated from individual nodes 133 capturing information such as Command name, Source IP address, Destination IP address, Destination Port, Port ID, and the like.

The analytic system 111 can be a cloud network orchestration system, such as KUBERNETES. The analytic system 111 can include object discovery module 141, object relationship module 143, enrichment module 147, and network tracer module 153. The object discovery module 141 can receive and log object information 115 discovered by the object discovery process 125. Additionally, the object discovery module 141 can associate information that uniquely identifies and maps object information 115 to a KUBERNETES cluster, such as tenancy ID, a cluster ID, and a cluster name.

The object relationship module 143 can be software, hardware, or a combination thereof that generates a set of relationships/mappings using the object information 115 determined by the object information process, which is used to determine the actual and intended service-to-service relationships (pod-to-pod, pod-to-service, deployment-to-service, etc.) using the tracer information 116.

The enrichment module 147 can be software, hardware, or a combination thereof that enriches the object information 115 and the tracer information 116 records and other information describing a pod with corresponding service and/or workload type entity information. This enrichment module 147 can identify eligible records for enrichment, among all the incoming payloads of the object information 115 and the tracer information 116 and then enrich the information for determining the mappings and topology, as described below.

The network tracer module 153 can be software, hardware, or a combination thereof that determines relationships between the service-to-service and/or service-to-workload object-types in the cluster 105. The network tracer module 153 can use incoming tracer information 116 (e.g., periodic TCP connect information) generated by the tracer process 129, along with the object relationship information generated by the object relationship module 143 to derive the relationships among services and workloads across the cluster 105. As detailed below, the relationship information can be used to generate relationship maps and network topologies for the cluster 105.

The client device 125 can be one or more computing devices allowing users to access and interact with analytic system 111. For example, the client device 125 can be a personal computer, workstation, server, mobile device, mobile phone, tablet device, processor, and/or other processing device capable of implementing and/or executing server processes, software, applications, etc. The client device 125 can include one or more processors that process software or other computer-readable instructions and include a memory to store the software, computer-readable instructions, and data. The client device 125 can also include a communication device to communicate with analytic system 111 via the communication links 117. Additionally, the client device 125 can generate a computer-user interface enabling a user to interact with the analytic system 111 using input/output devices. For example, by way of a computer-user interface, a user can connect to the analytic system 111 to manage, update, and troubleshoot the cluster 105.

C. System Architecture

Figure 2:
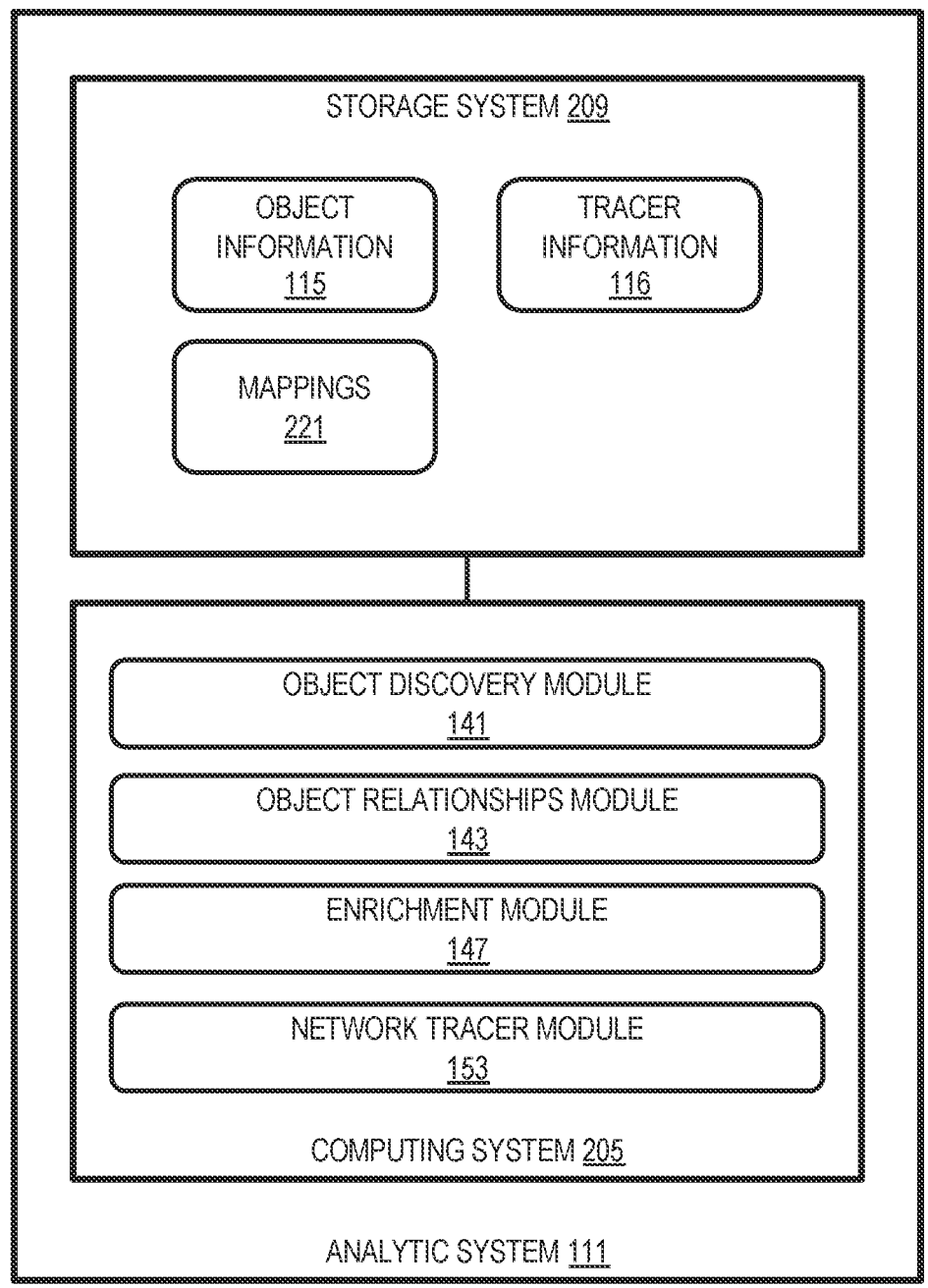
FIG. 2 illustrates a block diagram of an example system in accordance with one or more embodiments.

FIG. 2 shows a system block diagram illustrating an example of an analytic system 111 in accordance with one or more embodiments. The analytic system 111 can be the same or similar to that described above. The analytic system 111 includes hardware and software that perform processes and functions disclosed herein. The analytic system 111 can include a computing system 205 and a storage system 209. The computing system 205 can include one or more processors (e.g., microprocessor, microchip, or application-specific integrated circuit).

The storage system 209 can comprise one or more non-transitory computer-readable, hardware storage devices that store information and program instructions used by the processes and functions disclosed herein. For example, the storage system 209 can include one or more flash drives and/or hard disk drives. One or more embodiments of the storage system 209 stores information from the object discovery and network tracing. The storage system 209 can store object information 115 (e.g., generated by the object discovery process 125), tracer information 116 (e.g., generated by the tracer process 129), and mapping 221 (e.g., generated by the object discovery module 141). The object information 115 and tracer information 116 can be the same or similar to those previously described above.

The object information 115 can be a text-based datafile (e.g., a JavaScript Object Notation, "JSON") containing structured metadata describing a cluster (e.g., cluster 105), including objects, devices, services, deployments, and the like comprising the cluster. The metadata collected for individual objects, devices, services, and deployment can include, for example, name, identification (ID), internal Internet Protocol (IP) address, external IP address, host IP address, ports, controller name, controller kind, controller ID, and the like. The tracer information 116 can be a structured datafile (e.g., a table) describing outbound traffic (e.g., TCP connections) initiated from individual nodes 133. The tracer information 116 can include, for example, Command name, Source IP address, Destination IP address, Destination Port, Port ID, and the like. The mappings 221 can be structured information (e.g., a table) derived from the object information 115 and or the tracer information 116. As described in greater detail below, the mappings 221 can comprise associations between: pods and services, pods and workload types, ports/IP addresses and services, and IP addresses and pods.

The computing server 200 can execute an object discovery module 141, object relationships module 143, enrichment module 147, and network trace module 153, all of which can be the same or similar to those previously described above. It is noted that the analytic system 111 can comprise any general-purpose computing article of manufacture capable of executing computer program instructions installed thereon (e.g., a personal computer, server, etc.). However, the analytic system 111 is only representative of various possible equivalent-computing devices that can perform the processes described herein. To this extent, in embodiments, the functionality provided by the analytic system 111 can be any combination of general and/or specific purpose hardware and/or computer program instructions. In each embodiment, the program instructions and hardware can be created using standard programming and engineering techniques, respectively.

The components illustrated in FIG. 2 may be implemented in software and/or hardware. Each component may be distributed over multiple applications and/or machines. Multiple components may be combined into one application and/or machine. Operations described with respect to one component may instead be performed by another component.

D. Determining Service Relationships

Figure 3A:
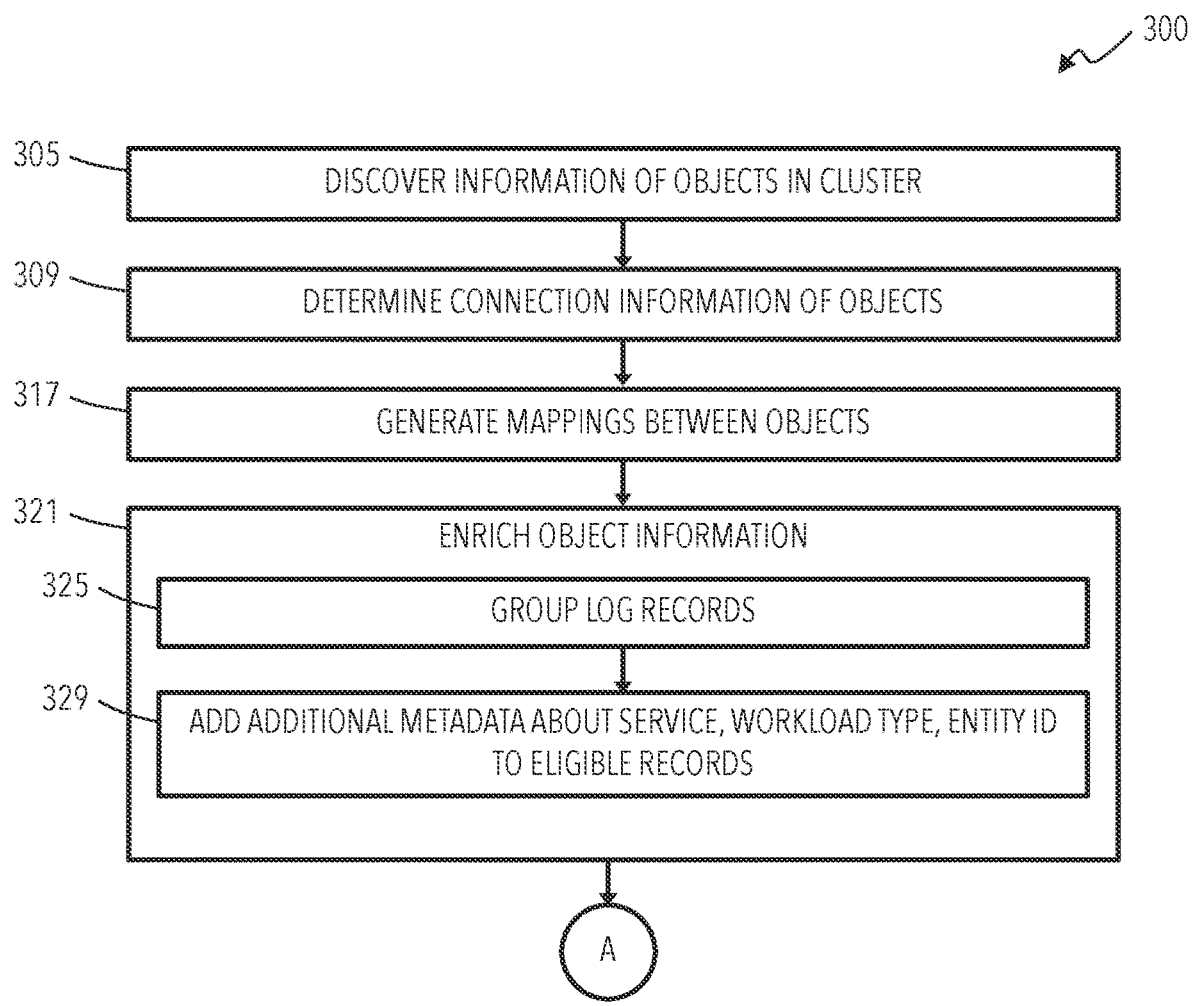
FIGS. 3A, 3B, and 3C illustrate a set of operations of an example process for augmenting existing data set for determining service relationships between components of a cluster in accordance with one or more embodiments.
Figure 3B:
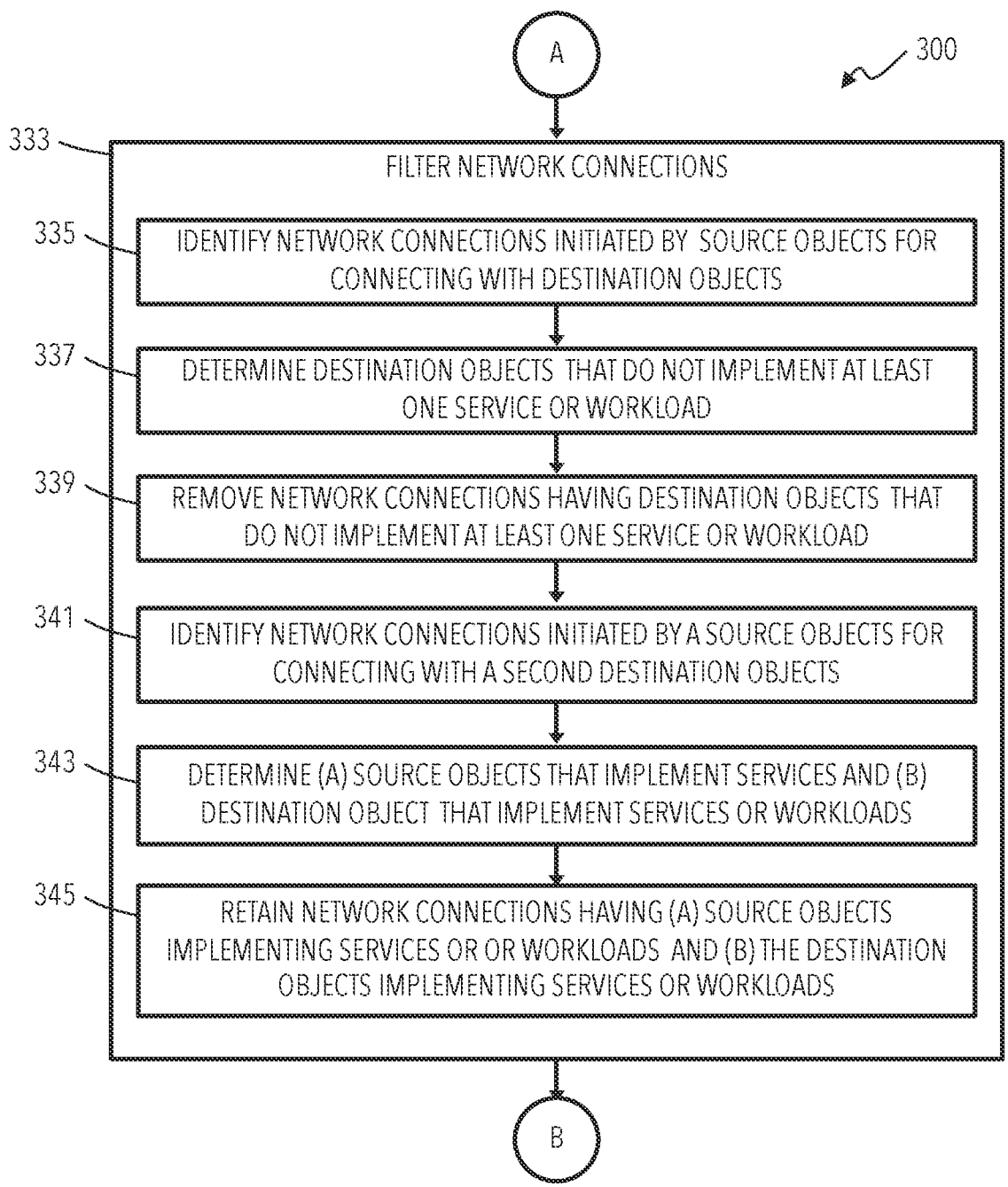
Figure 3C:
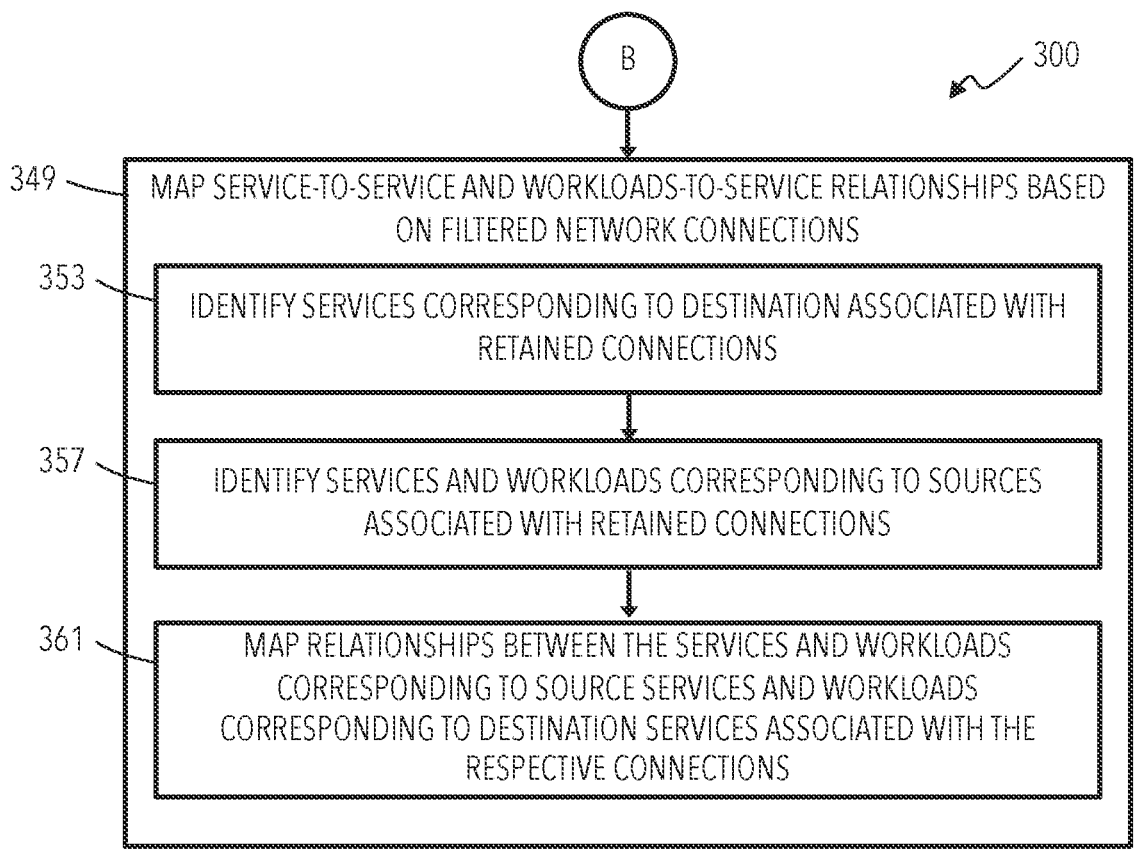

The flow diagrams in FIGS. 3A, 3B, and 3C illustrate functionality and operations of systems, devices, processes, and computer program products according to various implementations of the present disclosure. Each block in FIGS. 3A, 3B, and 3C can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A, 3B, and 3C. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

FIGS. 3A, 3B, and 3C illustrate a set of operations of an example process 300 for augmenting existing data set for determining service relationships between components of a cluster. Referring to FIG. 3A, at block 305, the system (e.g., executing object discovery process 125) discovers information of objects included in one or more clusters (e.g., cluster 105). One or more embodiments periodically execute queries (e.g., every 30 seconds) in the cluster that request the object information (e.g., object information 115) for object types that may be in the cluster. For example, the system can periodically execute a KUBERNETES job (e.g., a CronJob) that generates the object information. The object information can include metadata of the objects included in the one or more clusters. For example, the object information obtained by a query can include object names, namespaces, kinds, unique identifiers (UIDs) and internet protocol (IP) addresses. Object types can include, for example, node (e.g., node 133), pod (e.g., pod 135), deployment, ReplicaSet, a DaemonSet, a StatefulSet, Job, CronJob, Ingress, Service, and Endpoint/EndpointSlice.

One or more embodiments can collect different object information for different object types. For example, the object information of the clusters can include, for example: Cluster Name and Cluster ID. The object information for the nodes can include, for example: Node Name, Object UID (unique identifier), internal IP address (e.g., private network IP addresses), and external IP address (e.g., public network IP addresses). The object information of the pods can include, for example: Object Name, Namespace Name, Object UID, Pod IP address, and Node IP address. The object information of the ReplicaSet/job can include, for example: Object Name, Namespace Name, Object UID, Controller Kind (e.g., Deployment and CrobJob), Controller Name, and Controller UID. The object information of the Deployments, DaemonSets, StatefulSets and CronJobs can include, for example: Object Name, Namespace Name, and Object UID. The object information of the Services can include, for example: Service, Namespace Name, and Object UID, Cluster IP address, External IP address, Service type and Ports information. The object information of the EndpointSlices can include, for example: EndpointSlice, Namespace Name, and Object UID, Endpoints, and Ports.

At block 309, the system (e.g., executing tracer process 129) determines tracer information (e.g., tracer information 116) describing connections between objects, including the objects discovered at block 305. One or more embodiments collect the tracer information using eEPF to determine the connection information for all the nodes of the cluster. For example, a pod can continuously run a TCPConnect BPF program that periodically (e.g., every 30 seconds) collects outbound traffic from individual nodes by using TCP connects. TCPConnect can capture the following information, for example: command, source IP, destination IP, destination port, count, and other relevant information. Command identifies a command which initiated the connection. Source IP identifies an IP address form which connection is initiated. Destination IP identifies an IP address to which the connection is directed. Destination Port is the port on the IP to which the connection is initiated. Count is number of connections for the combination of the command, source IP, destination IP, destination port in particular trace interval.

At block 317, the system (e.g., executing object relationship module 143) generates mappings (e.g., mappings 221), such as pod-to-pod, pod-to-service, deployment-to-service, and the like, using the object information determined at block 305 and/or the tracer information determined at block 309. The mappings can be a set of predefined relationships usable to determine other relationships, such as described below regarding block 349. Generating the mappings can include, periodically fetching current the information (e.g., from storage system 209), determining the mappings, and storing back the results to the storage system (e.g., mappings 221). Examples of pre-defined mappings (1) to (5) are described below.

Cluster ID+Namespace+Pod=>Service+Namespace     (1)

Mapping (1) above can be used to derive a service to which a Pod belongs using the unique combination of cluster ID, namespace, and Object Name. The Cluster ID can be an identifier of a cluster (e.g., cluster 105). A Namespace can be an identifier of a virtual cluster within the cluster. A Pod can be a set of one or more containers deployed to a single node of the cluster.

Mapping (1) can be created using endpoint and pod information included in the object information. Endpoint information can include Endpoints/EndpointSlices generated by, for example, a KUBERNETES control plane (e.g., control plane 137). Mapping (1) can also be used to enrich information logged in the storage system. As an example of generating mapping (1), for services named in the object information the system can identify corresponding Endpoint/EndpointSlice information including the service name (e.g., Follower_Service). Additionally, the Endpoint/EndpointSlice information can include IP addresses of one or more pods (e.g., exposed for communication by the service. Using the IP address, the system can perform a text search of the object information to identify a particular pod having the IP address, determine the name of the pod (e.g., Pod_A), and map the Object Name to the service (e.g., Pod_A=>Follower_Service). It should be noted, the present examples are assumed to be within a same cluster having a same namespace and, therefore, have been excluded from the example mappings for the sake of explanation.

Cluster ID+Namespace+Pod=>WorkloadType+ Namespace     (2)

Mapping (2) can be used to enrich the data stored in the storage system by adding an additional metadata field based on WorkloadType, where the value corresponds to a workload type's identifier. A WorkloadType can be a classification or a descriptor of an application running in the cluster based on, for example, processing load, permanence (e.g., static, or dynamic), and task (e.g., ReplicaSet, Deployment/DaemonSet, StatefulSet, Job, CronJob, and the like). As an example of generating mapping (2), for a ReplicaSet name identified in the object information (e.g., alpha_replicaset), the system can determine the controller kind (e.g., Deployment). Then, having determined the controller kind/workload type (e.g., Deployment), the system can identify the controller/workload in the object information (e.g., alpha_deployment) by text search for the deployment name. Because the name of the pod follows the deployment name, the system can identify a pod (e.g., Pod_B) based on the deployment name and map the pod to the workload type (e.g., Pod_B=>alpha_deployment).

Cluster ID+IP+Port=>Service+Namespace     (3)

Mapping (3) can be used to determine an individual combination of an IP address and a Port belonging to a service (or exposed through a service). For example, mapping (3) can be used to identify services corresponding to a destination IP address and port for building service-to-service and/or pod/WorkloadType-to-Service relationships. IP can be an IP address of an object in the cluster. The port is an identifier of a connection through which an object in the cluster communicates (e.g., a transmission control protocol (TCP) port). Service can be an identifier of an abstraction used to expose an application running on a set of pods in the cluster. Mapping (3) can be determined using Endpoint/EndpointSlice and service information included in the object information. Endpoint/EndpointSlice information contains Pod IP and Port combinations, and service information contains IP and Port combinations. As an example of generating mapping (3), the object information collected for a service (e.g., Alpha_Service) can include a Cluster IP address of the service (e.g., 10.96.224.67) and port of the service (e.g., 6379). The system can generate map using the IP address and the port to the service determine the mapping (e.g., 10.96.224.67+6379=>Alpha_Service). In addition to cluster IP, external IP, and IP address from end points can be used to determine the mapping (3).

Cluster ID+IP=>Service+Namespace     (4)

Mapping (4) can be used to determine a given IP address belonging to a service (or exposed through a service. Mapping (4) can be created using endpoint/endpoint-slice and Service Objects information available in the object information. Endpoint/endpoint-slice information contains Pod IP whereas service information contains ClusterIP/External IP. Mapping (4) can also be used to determine a service corresponding to a Source IP. As an example of generating mapping (4), the object information collected for a service (e.g., Beta_Service) can include a Cluster IP address of the service (e.g., 10.96.0.1) used to determine an example mapping (e.g., =>Beta_Service). In addition to cluster IP; external IP, and IP address from end points can be used to determine the mapping (4).

Cluster ID+IP=>Pod+Namespace     (5)

Mapping (5) can be used to determine a given IP belonging to pods in the cluster. As all the pods may not be exposed through services, the system can use mapping (5) identify and map all the pods and the associated Pod IPs. This information can be used to create relationships in an application topology between a pod (or the owner of the pod) and a service in cluster when the source Pod does not belong to any service in cluster. Mapping (5) can be created using Pod Object information available in the object information. The system can use mapping (5) to identify the Pod corresponding to a Source IP. Additionally, mapping (5) can be used to derive a WorkloadType-to-Service relationships in a topology. As an example of generating mapping (5), the object information collected for a pod (e.g., Pod_C) includes an IP address of the pod (e.g., used to determine the mapping (e.g., 10.244.2.47=>Pod_C).

It is understood that ambiguities can occur when generating the mappings (1) to (5) above (which can be specific to a KUBERNETES cluster). To avoid such ambiguities, one or more embodiments avoid ambiguities arising from generating the mappings (1) to (5) by exempting pods using host Network, such as KUBERNETES system pods including kube-proxy, kube-flannel, etc., and corresponding objects.

At block 321, the system can enrich the object information determined at block 309 with corresponding service and workload type information determined at block 317. One or more embodiments identify eligible object information and tracer information records and other information describing a pod for enrichment from among the incoming object information tracer information. The relationships used for enriching the object information and tracer information records can be generated from the object information. For example, information coming from tenancies where there is one or more object information payloads exists can be eligible for enrichment. Enriching the object information and tracer information records can include, at block 325, grouping the records based on respective metadata, source, entity, and the like. Enriching the object information and tracer information records can also include, at block 329, adding additional metadata to the eligible records. For example, the additional metadata can include, Pod, Namespace, Cluster ID, Cluster Name, and the like.

Referring to FIG. 3B, as indicated by off-page connector "A," at block 333 the system filters out at least one network connection from the identified connections to obtain a filtered set of network connections. The filtering of block 333 can include, at block 335, identifying a network connection initiated by a first source object for connecting with a first destination object. For example, the system can identify the network connection using the tracer information. At block 337, the system can determine that the first destination object does not include any of a set of components that implement at least one service. For example, the system can determine that the first destination object lacks components for implementing a service using the object information. At block 337, the system can determine that the first destination object does not include any of a set of components that implement at least one service. At block 339, responsive to the determination at block 337, the system can remove the connection from the network connections generated at block 317.

The filtering of block 333 can also include, at block 341, identifying a network connection initiated by a second source object for connecting with a second destination object. At block 343, the system can determine that (a) the second source object includes a first component of the set of components that each implement at least one service or a workload (e.g., Deployment, DaemonSet, etc.) and (b) the second destination object comprises a second component of the set of components that each implement at least one service. At block 345, responsive at least to the determination at block 343, the system can retain the network connection in the network connections.

One or more embodiments perform the filtering of blocks 333 by determining service-to-service and/or service-to-workload type objects relationships in the cluster. The system can use the connection information determined at block 309 (e.g., by network tracer process 129) along with the mapping information determined at block 317 (e.g., determined by object relationships module 143) to determine the relationships among services and workload types throughout the cluster. One or more embodiments can identify records respectively containing the following information: COMMAND, SRC IP, DST IP, DST PORT. Command can indicate the command which initiated the connection. SRC IP can indicate a source IP from which the connection is initiated. The SRC IP can be a Pod IP running on that particular or a local host. DST IP can indicate a destination IP to which the connection is initiated, such as a service IP, a pod IP, a load balancer IP within the Cluster, or some external IP. DST PORT can indicate the Port on the Destination IP to which the connection is initiated.

Additionally, one or more embodiments perform the filtering of block 333 by determining whether to retain connections based on the COMMAND in the record containing one of the pre-defined set of keywords. For example, the keywords can start with are, "Kubelet" or "coredns." Kubelet initiates probes to every pod running on a given node to find the health of a given pod. Kubelet traffic can be filtered out as it is not application driven. Similarly, coredns can be filtered out as it has no context of pod/application and is internal to KUBERNETES.

Furthermore, one or more embodiments perform the filtering of block 333 by determining whether to retain connections based on determining destination service (e.g., DST IP+PORT or DST IP). For individual connections, the system can determine whether any destination service exists for the given combination by looking up the pre-defined mappings (e.g., Cluster ID+IP+Port=>Service+Namespace) generated at block 317. If the lookup is not successful, then the lookup can use Cluster ID+DST IP to determine whether any service exists for the given combination by using the pre-defined mapping (Cluster ID+IP=>Service+Namespace). If lookup is still not successful, then the destination service is unlikely mapped to any Service/Pod in the cluster and can be filtered out from the network connections.

Moreover, one or more embodiments perform the filtering of block 333 by determining whether to retain identified connections based on determining source services. One or more embodiments can derive the source services using SRC IP. For individual connections, the system can determine source services by looking up, using Cluster ID+SRC IP, any services existing for the given combination by using the pre-defined mapping (Cluster ID+IP=>Service+Namespace). If the lookup is not successful, then the system can perform a second lookup using Cluster ID+SRC IP to identify whether a pod exists for the given combination by using the pre-defined mapping (Cluster ID+IP=>Pod+Namespace). If the lookup is not successful, then the system can filter out the record. On the other hand, if the lookup of block is successful, then the system can use Cluster ID+Pod+Namespace to find the corresponding Workload object (Controller) by using the pre-defined mapping (Cluster ID+Namespace+Pod=>WorkloadType+Namespace). If the lookup is not successful, then the system can filter out the record.

Referring to FIG. 3C, as indicated by off-page connector "B," at block 349, the system can map service-to-service relationships and workload-to-service relationships having connections retained by the filtering at block 333. Mapping the relationships can include, at block 353, identifying services corresponding to individual destinations associated with the connections retained at block 333. The correspondences between individual destination services and individual connections can be determined using the mappings generated at block 317 and the object information determined at block 305.

As previously described, the connection identified by the tracer information can include command name, source IP address, destination IP address, destination port, and port ID. For example, using the mappings, the system can determine a particular service associated with a destination IP address and port of a particular connection in the tracer information. More specifically, an example connection identified by the tracer information can have a command name "discovery_service," a source IP "10.244.2.101," a destination IP "10.99.111.102," and a destination Port "8005." Using the predefined mapping (3), the system can text search the object information to identify a service "discovery_service_server" corresponding to IP address "10.99.111.102" and port "8005," which corresponds to the example destination IP and port included in the tracer information.

Mapping the relationships can also include, at block 357, identifying services and workloads corresponding to individual sources associated with the connections retained at block 333. As described above regarding block 353, the system can determine correspondences between individual source services or workloads and individual connections using the mappings determined at block 317 and the object information determined at block 305. Using the mappings, the system can associate the source IP address of the particular connection with a service identified by the mapping. Alternatively, using the mappings, the system can associate the source IP address with a particular pod, service, workload corresponding to the source IP address of the particular connection. For example, using the predefined mapping (5), the system can identify (e.g., by text searching) a pod, "Pod_Delta," having an IP address, "10.244.2.001," matching the source IP in the example tracer information of block 353. Based on the identified pod, the system can identify a particular service exposing the pod in the object information. For example, Pod_Delta may be exposed by a service "discovery_service_info." While the present example describes identifying a service based on an association between an IP address and a pod, it is understood that other associations can be determined based on other mappings determined at block 317. For example, in a some or similar manner, the system can determine associations of IP address with workload type (Deployment, DaemonSet, etc.), or external connections.

The system can generate the final relationships using the destination services determined at block 353 and source services/workload types determined at block 357. For example, the system can map the relationship between the destination service, "discovery_service," determined at block 353 and the source service, "discovery_service_info," determined at block 357. The mapped relationships can be used to generate an application topology identifying network connections for the cluster. The system can periodically update relationships mapped at block 361 in accordance with periodic updates to the object information and the tracer information. By doing so, the system can update the cluster topology to reflect changes in mapped relationships over time and graphically displayed the changes in a computer-user interface in combination with other metrics of the cluster. The user interface can allow users to efficiently visualize and manage the cluster, in addition to perceiving the cluster's health, load, and potential issues.

E. Computer Networks and Cloud Networks

In one or more embodiments, a computer network provides connectivity among a set of nodes (e.g., nodes 133). The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client (e.g., client device 125) may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network (e.g., communication links 117) provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or data set, stored by the computer network, is tagged with a tenant ID. A tenant is permitted access to a particular application, data structure, and/or data set only if the tenant and the particular application, data structure, and/or data set are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

F. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

G. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
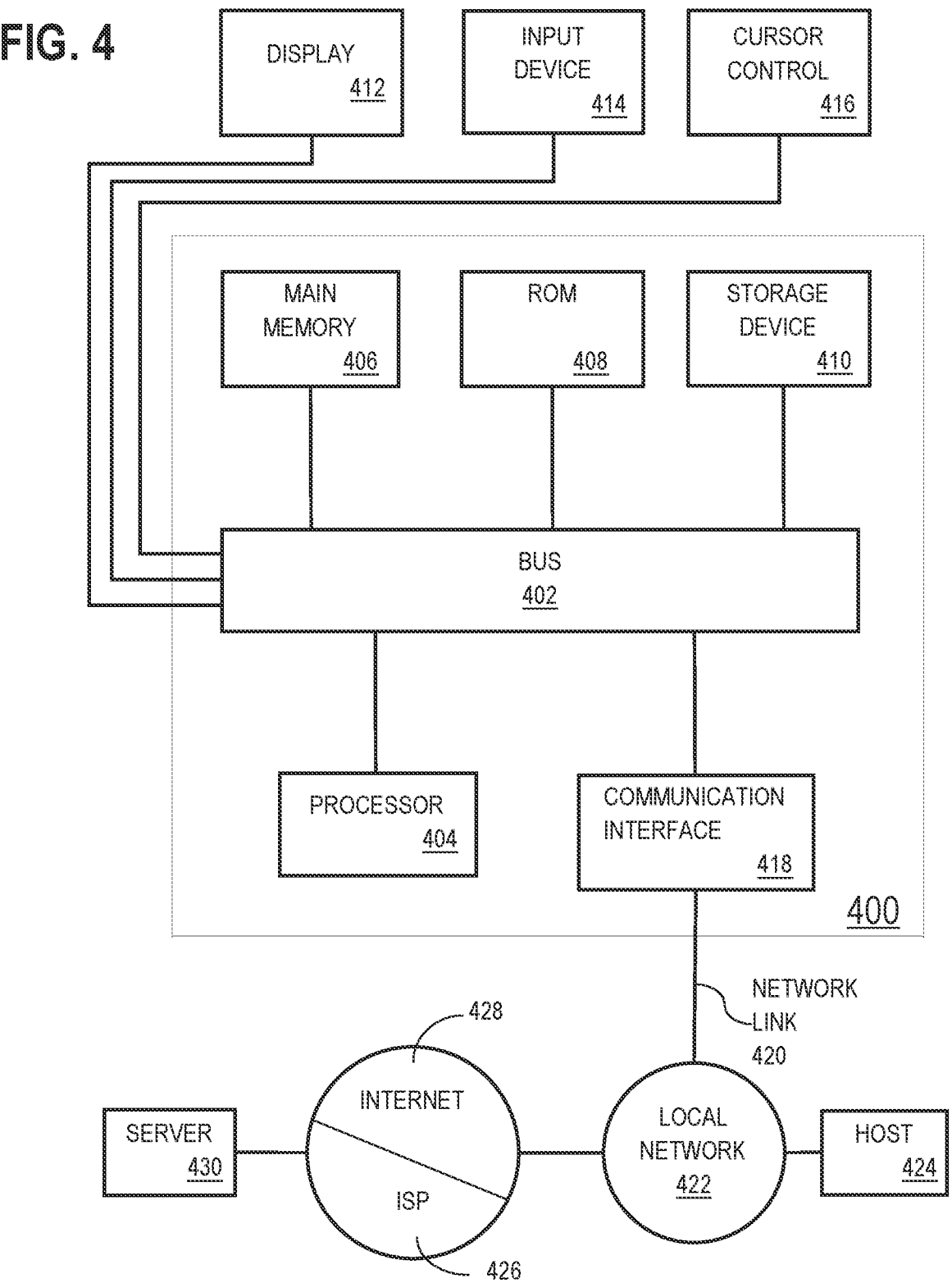
FIG. 4 shows a block diagram illustrating an example computer system in accordance with one or more embodiments.

For example, FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 enables two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
 executing a query to identify a set of components that each implement one or more services or workloads;
 executing a trace operation to identify a plurality of network connections associated with respective pairs of objects;
 filtering out at least one network connection from the plurality of network connections to obtain a filtered plurality of network connections at least by:
  identifying a first network connection of the plurality of network connections, the first network connection being initiated by a first source object for connecting with a first destination object;
  responsive at least to determining that the first destination object does not comprise any of the set of components that implement at least one service of the one or more services: removing the first network connection from the plurality of network connections;
  identifying a second network connection of the plurality of network connections, the second network connection being initiated by a second source object for connecting with a second destination object;
  responsive at least to determining that (a) the second source object comprises a first component of the set of components that each implement at least one service or workload of the one or more services or workloads and (b) the second destination object comprises a second component of the set of components that each implement at least one service of the one or more services: retaining the second network connection in the plurality of network connections for including in the filtered plurality of network connections;
 mapping relationships between the services and/or workloads in the one or more services or workloads based on the filtered plurality of network connections at least by:
  identifying a first service or workload implemented by a first component of the set of components that corresponds to the second source object associated with the second network connection;
  identifying a second service implemented by the second component of the set of components corresponding to the second destination object associated with the second network connection;
  determining a first relationship, between the first service or workload implemented by the first component and the second service implemented by the second component, to include in the relationship map.

2. The medium of claim 1, wherein the query comprises a request for objects of a particular set of one or more types.

3. The medium of claim 1, filtering out at least one network connection from the plurality of network connections to obtain the filtered plurality of network connections further comprises:
 responsive at least to determining that the second source object does not comprises a third component of the set of components implementing at least one service or workload of the one or more services or workloads, excluding the second network connection in the plurality of network connections from the filtered plurality of network connections.

4. The medium of claim 1, filtering out at least one network connection from the plurality of network connections to obtain the filtered plurality of network connections further comprises:
 responsive at least to determining that the second destination object comprises a third component of the set of components that does not implement at least one service of the one or more services, excluding the second network connection in the plurality of network connections from the filtered plurality of network connections.

5. The medium of claim 1, wherein executing the query to identify the set of components that each implement the at least one service of the one or more services comprises:
 determining services to which one or more pods of a cluster belongs based on a mapping from an identifier of the cluster, a namespace of the cluster, and identifiers of the one or more pods to the services and the namespace.

6. The medium of claim 1, wherein executing the query to identify the set of components that each implement the at least one service of the one or more services comprises:
 determining workload types respectively controlling one or more pods in a cluster based on a mapping from an identifier of the cluster, a namespace of the cluster, and identifiers of the one or more pods to workload types and the namespace.

7. The medium of claim 1, wherein executing the query to identify the set of components that each implement the at least one service of the one or more services comprises:
 determining respective combinations of IP addresses and ports of at least one service of a plurality of services based on a mapping from an identifier of a cluster, a namespace of the cluster, IP addresses of the at least one service of a plurality of services, and ports of the at least one service of a plurality of services and a namespace of the cluster.

8. The medium of claim 1, wherein executing the query to identify the set of components that each implement the at least one service of the one or more services comprises:
 determining respective IP addresses of the at least one service of a plurality of services executing in a cluster based on a mapping from an identifier of the cluster and IP addresses of the at least one service of a plurality of services to respective identifiers of the at least one service of a plurality of services and a namespace of the cluster.

9. The medium of claim 1, wherein executing the query to identify the set of components that each implement the at least one service of the one or more services comprises:

determining IP addresses of one or more pods in a cluster based on a mapping from an identifier of the cluster and the IP addresses to the one or more pods and a namespace of the cluster.

10. A method comprising:

executing a query to identify a set of components that each implement one or more services or workloads;

executing a trace operation to identify a plurality of network connections associated with respective pairs of objects;

filtering out at least one network connection from the plurality of network connections to obtain a filtered plurality of network connections at least by:
identifying a first network connection of the plurality of network connections, the first network connection being initiated by a first source object for connecting with a first destination object;
responsive at least to determining that the first destination object does not comprise any of the set of components that implement at least one service of the one or more services: removing the first network connection from the plurality of network connections;
identifying a second network connection of the plurality of network connections, the second network connection being initiated by a second source object for connecting with a second destination object;
responsive at least to determining that (a) the second source object comprises a first component of the set of components that each implement at least one service or workload of the one or more services or workloads and (b) the second destination object comprises a second component of the set of components that each implement at least one service of the one or more services: retaining the second network connection in the plurality of network connections for including in the filtered plurality of network connections;

mapping relationships between the services and/or workloads in the one or more services or workloads based on the filtered plurality of network connections at least by:
identifying a first service or workload implemented by a first component of the set of components that corresponds to the second source object associated with the second network connection;
identifying a second service implemented by the second component of the set of components corresponding to the second destination object associated with the second network connection;
determining a first relationship, between the first service or workload implemented by the first component and the second service implemented by the second component, to include in the relationship map.

11. The method of claim 10, wherein the query comprises a request for objects of a particular set of one or more types.

12. The method of claim 10, filtering out at least one network connection from the plurality of network connections to obtain the filtered plurality of network connections further comprises:
responsive at least to determining that the second source object does not comprises a third component of the set of components implementing at least one service or workload of the one or more services or workloads, excluding the second network connection in the plurality of network connections from the filtered plurality of network connections.

13. The method of claim 10, filtering out at least one network connection from the plurality of network connections to obtain the filtered plurality of network connections further comprises:
responsive at least to determining that the second destination object comprises a third component of the set of components that does not implement at least one service of the one or more services, excluding the second network connection in the plurality of network connections from the filtered plurality of network connections.

14. The method of claim 10, wherein executing the query to identify the set of components that each implement the at least one service of the one or more services comprises:
determining services to which one or more pods of a cluster belongs based on a mapping from an identifier of the cluster, a namespace of the cluster, and identifiers of the one or more pods to the services and the namespace.

15. The method of claim 10, wherein executing the query to identify the set of components that each implement the at least one service of the one or more services comprises:
determining workload types respectively controlling one or more pods in a cluster based on a mapping from an identifier of the cluster, a namespace of the cluster, and identifiers of the one or more pods to workload types and the namespace.

16. The method of claim 10, wherein executing the query to identify the set of components that each implement the at least one service of the one or more services comprises:
determining respective combinations of IP addresses and ports of at least one service of a plurality of services based on a mapping from an identifier of a cluster, a namespace of the cluster, IP addresses of the at least one service of a plurality of services, and ports of the at least one service of a plurality of services and a namespace of the cluster.

17. The method of claim 10, wherein executing the query to identify the set of components that each implement the at least one service of the one or more services comprises:
determining respective IP addresses of the at least one service of a plurality of services executing in a cluster based on a mapping from an identifier of the cluster and IP addresses of the at least one service of a plurality of services to respective identifiers of the at least one service of a plurality of services and a namespace of the cluster.

18. The method of claim 10, wherein executing the query to identify the set of components that each implement the at least one service of the one or more services comprises:
determining IP addresses of one or more pods in a cluster based on a mapping from an identifier of the cluster and the IP addresses to the one or more pods and a namespace of the cluster.

19. A system comprising:

at least one device including a hardware processor a non-transitory computer-readable storage device storing program instruction that, when executed by the hardware processor, configure the system to perform operations comprising:
executing a query to identify a set of components that each implement one or more services or workloads;
executing a trace operation to identify a plurality of network connections associated with respective pairs of objects;
filtering out at least one network connection from the plurality of network connections to obtain a filtered plurality of network connections at least by:

identifying a first network connection of the plurality of network connections, the first network connection being initiated by a first source object for connecting with a first destination object;

responsive at least to determining that the first destination object does not comprise any of the set of components that implement at least one service of the one or more services: removing the first network connection from the plurality of network connections;

identifying a second network connection of the plurality of network connections, the second network connection being initiated by a second source object for connecting with a second destination object;

responsive at least to determining that (a) the second source object comprises a first component of the set of components that each implement at least one service or workload of the one or more services or workloads and (b) the second destination object comprises a second component of the set of components that each implement at least one service of the one or more services: retaining the second network connection in the plurality of network connections for including in the filtered plurality of network connections;

mapping relationships between the services and/or workloads in the one or more services or workloads based on the filtered plurality of network connections at least by:

identifying a first service or workload implemented by a first component of the set of components that corresponds to the second source object associated with the second network connection;

identifying a second service implemented by the second component of the set of components corresponding to the second destination object associated with the second network connection;

determining a first relationship, between the first service or workload implemented by the first component and the second service implemented by the second component, to include in the relationship map.

20. The system of claim 19, wherein the query comprises a request for objects of a particular set of one or more types.

21. The system of claim 19, filtering out at least one network connection from the plurality of network connections to obtain the filtered plurality of network connections further comprises:

responsive at least to determining that the second source object does not comprises a third component of the set of components implementing at least one service or workload of the one or more services or workloads, excluding the second network connection in the plurality of network connections from the filtered plurality of network connections.

22. The system of claim 19, filtering out at least one network connection from the plurality of network connections to obtain the filtered plurality of network connections further comprises:

responsive at least to determining that the second destination object comprises a third component of the set of components that does not implement at least one service of the one or more services, excluding the second network connection in the plurality of network connections from the filtered plurality of network connections.

23. The system of claim 19, wherein executing the query to identify the set of components that each implement the at least one service of the one or more services comprises:

determining services to which one or more pods of a cluster belongs based on a mapping from an identifier of the cluster, a namespace of the cluster, and identifiers of the one or more pods to the services and the namespace.

24. The system of claim 19, wherein executing the query to identify the set of components that each implement the at least one service of the one or more services comprises:

determining workload types respectively controlling one or more pods in a cluster based on a mapping from an identifier of the cluster, a namespace of the cluster, and identifiers of the one or more pods to workload types and the namespace.

25. The system of claim 19, wherein executing the query to identify the set of components that each implement the at least one service of the one or more services comprises:

determining respective combinations of IP addresses and ports of at least one service of a plurality of services based on a mapping from an identifier of a cluster, a namespace of the cluster, IP addresses of the at least one service of a plurality of services, and ports of the at least one service of a plurality of services and a namespace of the cluster.

26. The system of claim 19, wherein executing the query to identify the set of components that each implement the at least one service of the one or more services comprises:

determining respective IP addresses of the at least one service of a plurality of services executing in a cluster based on a mapping from an identifier of the cluster and IP addresses of the at least one service of a plurality of services to respective identifiers of the at least one service of a plurality of services and a namespace of the cluster.

27. The system of claim 19, wherein executing the query to identify the set of components that each implement the at least one service of the one or more services comprises:

determining IP addresses of one or more pods in a cluster based on a mapping from an identifier of the cluster and the IP addresses to the one or more pods and a namespace of the cluster.

\* \* \* \* \*

UNITED STATES PATENT AND TRADEMARK OFFICE
CERTIFICATE OF CORRECTION

PATENT NO. : 11,916,741 B1  
APPLICATION NO. : 18/149908  
DATED : February 27, 2024  
INVENTOR(S) : Vuda et al.

Page 1 of 1

It is certified that error appears in the above-identified patent and that said Letters Patent is hereby corrected as shown below:

In the Drawings

On sheet 4 of 6, in FIG. 3B, and on the title page, the illustrative print figure, under Reference Numeral 345, Line 2, delete "OR OR" and insert -- OR --, therefor.

In the Specification

In Column 5, Line 9, delete "and or" and insert -- and/or --, therefor.

In Column 6, Line 29, delete "CrobJob)," and insert -- CronJob), --, therefor.

In Column 7, Line 24, delete "(e.g.," and insert -- (e.g., 10.244.4.14) --, therefor.

In Column 8, Line 27, delete "(e.g.," and insert -- (e.g., 10.96.0.1 --, therefor.

In Column 8, Line 46, delete "(e.g.," and insert -- (e.g., 10.244.2.47) --, therefor.

Signed and Sealed this  
Twenty-third Day of July, 2024

Katherine Kelly Vidal  
*Director of the United States Patent and Trademark Office*